D. McGUIRE.
WAGON-BRAKE LEVER.

No. 184,095. Patented Nov. 7, 1876.

WITNESSES:
Francis McArdle
John Goethals

INVENTOR:
D. McGuire
BY
ATTORNEYS.

UNITED STATES PATENT OFFICE.

DAVID McGUIRE, OF NEW GORDON, MISSOURI.

IMPROVEMENT IN WAGON-BRAKE LEVERS.

Specification forming part of Letters Patent No. 184,095, dated November 7, 1876; application filed September 22, 1876.

*To all whom it may concern:*

Figure 1:
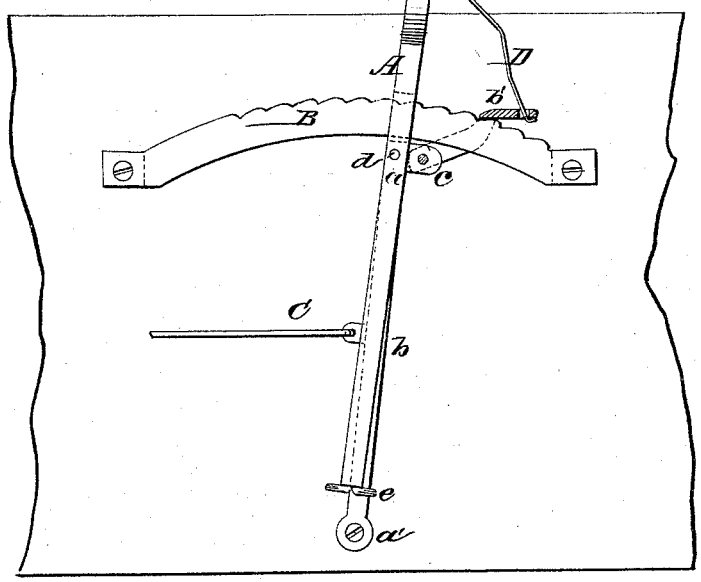
Figure 2:
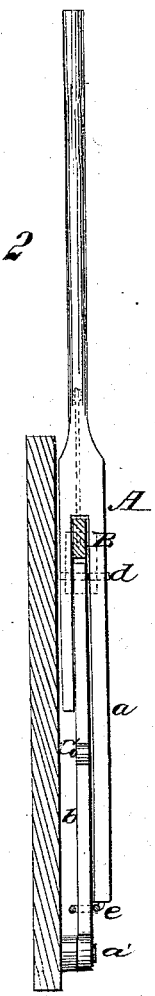

Be it known that I, DAVID MCGUIRE, of New Gordon, county of Ray, and State of Missouri, have invented a new and Improved Wagon-Brake, of which the following is a specification:

Figure 1 is a side elevation. Fig. 2 is a partial section.

Similar letters of reference indicate corresponding parts.

My invention consists in the arrangement of a jointed lever for operating the brake connected with a pawl, that engages with rounded ratchet-teeth on a curved bar attached to the side of the wagon, and arranged in such a manner that the pull of the brake-rod on one part of the lever locks the pawl in the curved bar. The lever is capable of automatically unlocking the pawl when it is moved to relieve the brakes.

A is a lever, consisting of the parts $a$ and $b$. The part $b$ is pivoted at $a'$, and is provided with a short arm, $c'$, projecting at right angles from it, to which the pawl $b$ is jointed. The part $a$ of the lever A is forked to embrace the curved bar B and the free end of the part $b$, to which it is pivoted by a pin, $d$. One leg of the fork of the part $a$ extends down to the lower end of the part $b$, where it is provided with a loop, $e$, that surrounds the part $b$, and limits the motion of the part $a$. The pawl $b'$ is forked to embrace the bar B and the arm $c$, to which it is pivoted. The bar B is provided with rounded ratchet-teeth, with which the pawl $b'$ engages.

D is a rod attached to the lever A, and passing through a hole in the pawl, and bent into a hook, so that it may engage with the pawl as it is moved forward.

C is a rod that hooks into an ear projecting from one side of the part $b$, and connects with the brake.

When the lever A is drawn back the pawl $b'$ engages with the ratchet-teeth of the bar B, and, by virtue of its being pivoted below the face of the bar, the strain of the brake tends to draw it both forward and downward, causing it to engage with the ratchet-teeth of the bar with considerable force. The brake is relieved by moving the lever forward on the pivot $d$ until the pawl $b$ is liberated by the rod D, this motion being limited by the loop $e$.

The advantages claimed for this invention are that the brake, when set, is held securely by the pawl $b$, the pressure of the brake assisting to draw it down into the notches of the curved bar. It requires no extra levers to release the brake, and it can be readily released by the driver from the ground by moving the lower end of the part $a$.

Having thus described my invention, I claim as new and desire to secure by Letters Patent—

The combination of the loop $e$, parts $a$ and $b$ of the lever A, the pawl $b'$, rod D, and ratchet-bar B, substantially as shown and described.

DAVID McGUIRE.

Witnesses:
   J. C. ISLEY,
   GORDON CLEVENGER.